July 7, 1959 G. G. FREY 2,894,093
BRAKE FLUID SIGNAL
Filed Oct. 11, 1957

Gerard G. Frey
INVENTOR.

BY *Clarence A. O'Brien*
*and Harvey B. Jacobson*
Attorneys

2,894,093

BRAKE FLUID SIGNAL

Gerard G. Frey, Pulaski, N.Y.

Application October 11, 1957, Serial No. 689,708

1 Claim. (Cl. 200—84)

This invention relates generally to signalling devices, and more particularly to a warning signal for brake fluid systems.

The primary object of this invention is to provide a brake fluid signal which will emit a signal when the brake fluid is becoming too low.

Another object of this invention is to provide a brake fluid signal which will quickly and surely react to a condition of brake fluid in the system, and transmit a signal so that the operator of a vehicle will be aware that such a condition exists.

A still further object of the invention is to produce a simple and inexpensive device and yet one which will be exceedingly effective for the purpose for which it is designed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
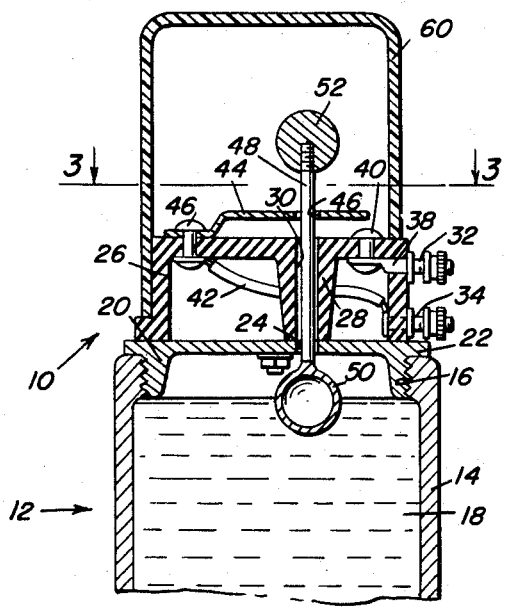
Figure 1 is a vertical sectional view of the brake fluid signaling device comprising the present invention, illustrating same connected to the fluid reservoir of a master brake cylinder.
Figure 2:
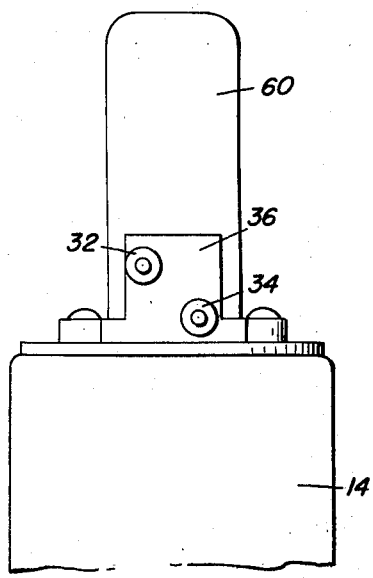
Figure 2 is an end elevational view of the device illustrated in Figure 1.
Figure 3:
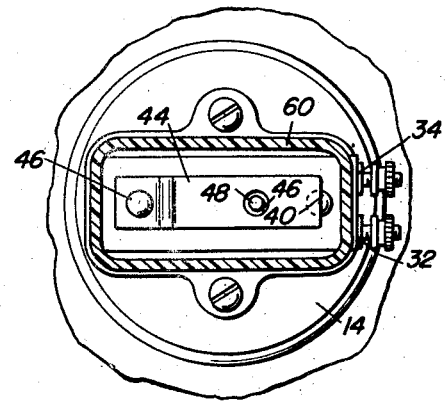
Figure 3 is a horizontal sectional view taken substantially on the plane defined by reference line 3—3 of Figure 1 illustrating the details of construction thereof.

Referring now more specifically to the drawings, the numeral 10 generally designates the brake fluid signal comprising the present invention, which is illustrated as attached to a master brake cylinder reservoir 12.

Master cylinder reservoir 12 generally comprises a body 14 having a threaded aperture 16 in the upper surface thereof. This body 14 is filled with brake fluid 18. A threaded plug 20 having an extending flange 22, is threaded into threaded opening 16, and serves to close the master cylinder reservoir. It is to be noted that this plug has an opening 24 formed vertically therethrough for a purpose which will be described below. A substantially rectangular platform 26 made of a dielectric material, is mounted atop the plug, and has a central cylindrical portion 28 which has an opening 30 formed vertically therethrough which is in alignment with opening 24.

Binding posts 32 and 34 are mounted on one end portion 36 of the platform 26, and are adapted to selectively hold electric conductors thereto. The post 32 is connected by means of electric connector 38, to a fixed contact 40 mounted on the upper surface of the platform 26. The post 34 is connected by means of electric conductor 42 to a resilient movable contact 44, which is also mounted by means of rivet 46 to the upper surface of the dielectric platform 26. An opening 46 is formed in movable contact 44 in alignment with opening 24 and bore 30.

A vertical rod 48 is disposed through the aligned openings, and has a float 50 connected to its lower end, and a weight 52 threaded onto the upper end.

Now it can be seen that the float 50 will be disposed in the same relative relation to the upper surface of the liquid, no matter where this upper surface of the liquid is located in the cylinder. Correspondingly, weight 52 will rise or be lowered vertically depending on the position of float 50. The action of weight 52 as it descends will cause movable contact 44 to move into contact with fixed contact 40, and thus close a circuit, and indicate by any suitable means that the brake fluid in the reservoir 12 is too low.

As may be seen in Figure 1, a cover 60 is disposed about the device and substantially encloses same. The lower portion of the cover 60 is provided with a cutout or opening which accommodates the end portion 36 of the platform 26 for exposing and giving access to the binding posts 32 and 34.

Figure 4:
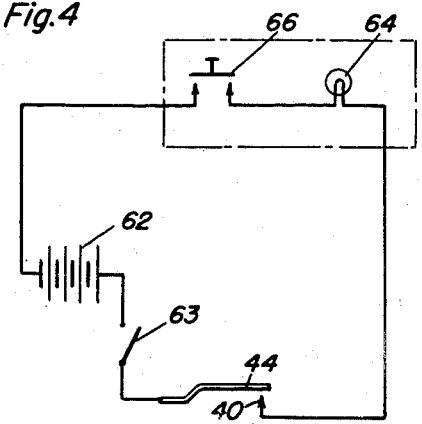
Figure 4 is a schematic diagram of the circuit to be used in conjunction with the present invention.

Referring now to Figure 4 in particular, it may be seen that a complete circuit is set up whereby the battery of a car 62 is connected to ignition switch 63, which is in turn connected to the switch comprising the present invention including movable contact 44 and stationary contact 40, and a signaling device which may be in the form of a bulb 64 is connected to the circuit, and finally a detector switch 66 is included in the circuit. It will be noted that all of the preceding named devices are connected in series. Thus, when the ignition of a car is turned on, switch 63 will be closed. Now, when it is desired to find out whether or not the liquid level in the reservoir 12 is sufficient, the switch 66 would be closed by an operator manually, and if the liquid level 18 in the reservoir is too low, contact 44 will be engaged with contact 40, and complete the circuit, thus illuminating bulb 64, or any other suitable electric signal which may be used.

It may now be seen that I have herein shown and described a new and improved type of brake fluid signal, which is simple and efficient in operation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

A fluid level signal for master brake cylinder reservoirs, said signal comprising: a filler plug on the reservoir, an elongated platform on said plug, a stationary electric contact on said platform, a resilient electric contact on the platform engageable with said stationary contact, a cover substantially enclosing the platform and the contacts, said cover having an opening in its lower portion exposing one end portion of the platform, a pair of binding posts mounted on the exposed end portion of the platform and electrically connected to the contacts, a vertical rod slidable through the plug, the platform and the resilient contact, a float on the lower end of said rod operable in the reservoir, a ball on the upper end of the rod engageable with the resilient contact for engaging same with the stationary contact, and a signal device electrically connected to the binding posts.

References Cited in the file of this patent

UNITED STATES PATENTS

| | | |
|---|---|---|
| 1,497,712 | Crandall et al. | June 17, 1924 |
| 1,745,031 | Scott | Jan. 28, 1930 |
| 2,786,110 | Bitle | Mar. 19, 1957 |